Oct. 21, 1958   J H. H. OVERHOLSER ET AL   2,857,129
GATE VALVE WITH FLUID RESPONSIVE SEAL THEREFOR
Filed April 28, 1953
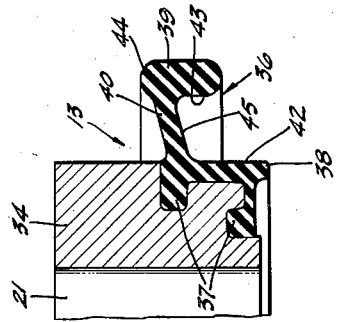
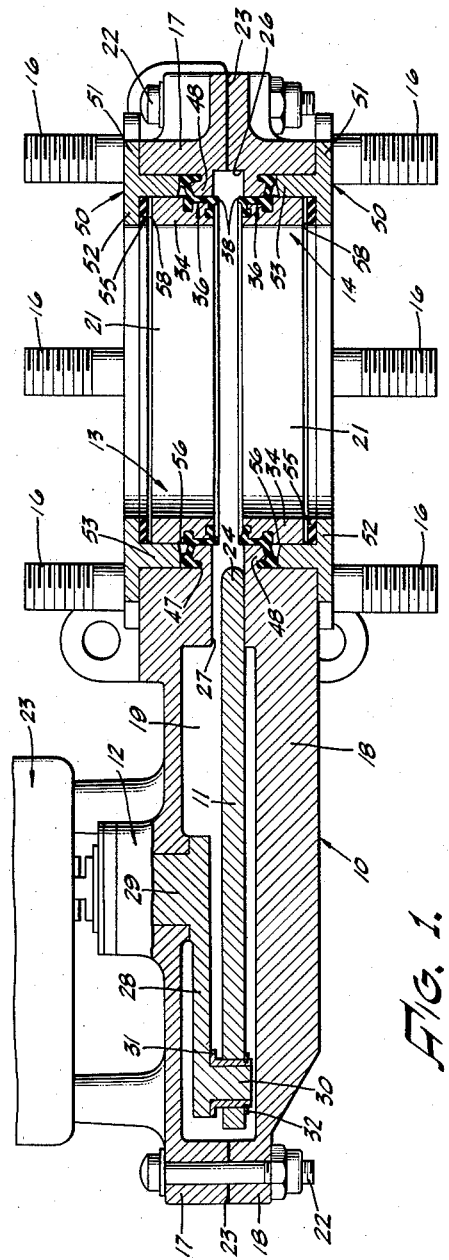
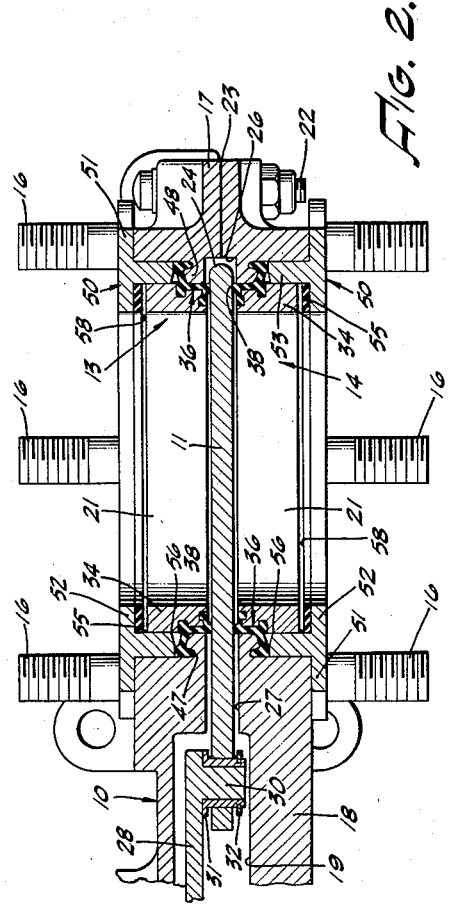
J. HOMER H. OVERHOLSER
LLOYD E. TOMLINSON
INVENTORS
BY
ATTORNEYS

United States Patent Office 2,857,129
Patented Oct. 21, 1958

2,857,129

GATE VALVE WITH FLUID RESPONSIVE SEAL THEREFOR

J. Homer H. Overholser, Burbank, and Lloyd E. Tomlinson, Woodland Hills, Calif., assignors to Hydro-Aire, Inc., Burbank, Calif., a corporation of California Application April 28, 1953, Serial No. 351,536

17 Claims. (Cl. 251—172)

The present invention relates to a gate valve, and to an improved means for sealing the gate member of such a valve to prevent leakage of fluid when the gate is in closed position.

In conventional gate valve structures the gate member is guided, when it moves from open to closed position, along a fixed path and into contact with a sealing member. The relationship between the sealing member and gate is such that the primary seal, and normally the only seal, is effected on the edge or upstream side of the gate and results from the pressing relationship created between the sealing member and the rigidly located gate member. With such an arrangement, the applying of fluid pressure to the gate does not increase the effectiveness of the seal, and in many instances decreases it since any slight movement of the gate will tend to decrease the amount of pressing. Because of the guiding of the gate along a fixed path, and the locating of the seal on the edge or upstream side of the gate, conventional gate valves frequently do not effect the desired seal, particularly after repeated opening and closing operations have resulted in wearing of the sealing member.

In view of the above problems characterizing the field of gate valves and gate valve seals, it is an object of the present invention to provide a gate valve embodying floating gate and sealing elements, and in which the pressure of the blocked fluid is utilized to create an effective seal on the downstream side of the gate.

Another object of the invention is to provide a floating sealing assembly which constitutes substantially the sole means for guiding the gate and retaining it in closed position, and which incorporates resilient arm portions to maintain a sealing rib in predetermined pressing engagement with the gate member.

A further object is to provide a floating sealing assembly which is substantially unaffected by wear caused by opening and closing of the gate.

These and other objects and advantages of the invention will be more fully set forth in the following description of an embodiment of the invention considered in connection with the attached drawing to which they relate.

In the drawing:

Figure 1 is a vertical central section of the gate valve and gate valve seals, showing the gate member in open position permitting the flow of fluid through the associated conduit;

Figure 2 is a vertical central section corresponding to the conduit and sealing portions of Figure 1, and showing the gate member in its closed or flow blocking position; and Figure 3 is an enlarged detail view illustrating a sealing assembly prior to its mounting in the gate valve.

Referring to the drawing, the gate valve structure is seen to comprise a valve casing 10, a gate member 11 mounted in the casing 10 and movable between open and closed positions by a gate-shifting assembly 12, and a pair of mounting and sealing assemblies 13 and 14 adapted to effectively prevent leakage of fluid through the valve when gate 11 is in closed position. It is to be understood that the valve may be mounted to control the flow of fluid through any suitable pipe or conduit, for example by utilizing the illustrated studs 16 to associate the valve casing 10 with the flanges of opposed conduit sections. In the following description it will be assumed that the sealing assembly 13 is disposed on the downstream side of gate 11, and the sealing assembly 14 on the upstream side, although the direction of fluid flow is immaterial since the assemblies 13 and 14 are symmetrical about the plane of gate 11.

The valve casing 10 may be generally rectangular in plan, and preferably comprises upper and lower components 17 and 18 which are suitably recessed and apertured to form a chamber 19 for the gate 11 when in retracted position, and a cylindrical conduit 21 permitting vertical flow of fluid between the associated pipe or conduit sections. The upper and lower casing members 17 and 18 are rigidly locked together as by bolts 22, and are sealed by a gasket 23 to prevent fluid leakage from the interior of the casing.

Gate member 11 comprises a horizontally disposed plate which is preferably generally rectangular in plan, and is provided with a bevelled or rounded forward edge portion 24 to facilitate closing movement of the gate past the sealing assemblies 13 and 14 and into a groove 26 formed in casing 10 remote from chamber 19. Gate 11 is of a width sufficient to substantially fill the gate chamber 19 when retracted, and to completely block the flow of fluid through conduit 21 when closed as shown in Figure 2. The length of the gate 11, longitudinally of the valve, is substantially greater than that of gate chamber 19. Accordingly, the forward gate portion is disposed in a horizontal slot 27 in casing 10 even when the valve is fully open or retracted as shown in Figure 1, the slot 27 serving to connect gate chamber 19 with conduit 21 to permit opening and closing gate movements.

The valve-shifting assembly 12 preferably comprises a crank 28 which is journalled at 29 in upper casing member 17 centrally of gate chamber 19, the outer end of crank 28 being formed with a downwardly extending pin 30 adapted to cooperate with a suitable transverse slot in the gate member. The pin 30 is provided with a bushing 31 and with a snap ring 32, the spacing of the latter from the base of the bushing being substantially greater than the thickness of gate 11. The bushing 31 is substantially smaller than the cooperating transverse slot, so that free vertical or floating movement of the gate is permitted. Crank 28 may be rotated manually or by a suitable remote control device, indicated generally at 33.

When the crank pin 30 is in the outer position shown in Figure 1, the gate 11 is completely retracted permitting fluid flow through conduit 21. When, on the other hand, the crank 28 is rotated so that its end portion is adjacent slot 27 as illustrated in Figure 2, the gate 11 is shifted forwardly until its edge 24 is in groove 26. Upward flow of fluid through conduit 21 is then completely blocked, and any leakage of fluid from the valve is prevented by the gasket 23 and by suitable seals, not shown, associated with the crank journal 29.

The downstream sealing assembly 13 and the upstream sealing assembly 14 being identical in construction and mounting, only the downstream assembly 13 will be described. The assembly 13 comprises a relatively rigid ring member 34, preferably formed of aluminum, and a resilient sealing element 36 formed of a suitable elastomer such as a rubber compound. As best shown in Figure 3, the sealing element 36 comprises a body 37 mounted on the lower outer edge of mounting ring 34, an integral annular rib or lip 38 extending axially from the outer portion of body 37 for engagement with gate 11, a mounting and sealing ring 39 spaced outwardly from the upper portion of body 37 concentrically of ring 34, and a thick-walled frusto-conical web 40 formed integral with the upper portions of body 37 and ring 39 to resiliently associate them.

The body 37 of seal element 36 is seen to comprise two ridges or tongues which extend, respectively, into corresponding grooves in the peripheral and end surfaces of aluminum ring 34, the latter being rectangular in section except where grooved as indicated. An interlocking mounting is thus provided between the seal element 36 and ring 34, so that these elements remain closely associated regardless of stresses resulting from movement of the seal during use. In order to increase the interlocking connection, and prevent the possibility of leakage between the seal and its mounting ring, the inner surfaces of body 37 are bonded to the abutting metal surfaces by any suitable bonding process. Except where integral with web 40 and rib 38, the outer surfaces of body 37 are substantially flush with the merging peripheral or end surfaces of ring 34. Thus the cylindrical surface 42 of body 37 forms an extension of the corresponding peripheral surface of the ring.

The sealing rib or lip 38 is relatively narrow and extends axially a slight distance beyond the end surface of ring 34, so that the edge of rib 38 is the only portion of sealing assembly 13 to contact the gate 11. The mounting and sealing ring 39 is elongated in section to form a sealing surface 43 on its inner side, the surface 43 being concentric with body surface 42 and spaced from it. The edge of ring 39 is rounded to form a ridge 44, and the opposite ring edge is correspondingly rounded for insertion into a casing groove as will be described. The web 40, which comprises a generally continuous ring member, preferably inclines radially from body surface 42 toward the base of ridge 44.

Referring again to Figures 1 and 2, the casing portion 17 is formed, adjacent conduit 21, with an upwardly opening annular groove 47 and an adjacent annular bead 48. The groove 47 is shaped correspondingly to the lower rounded edge of resilient sealing ring 39. Similarly, bead 48 is complementary to the recess formed by surfaces 42, 43, and 45 of the sealing element. It follows that when the sealing assembly 13 is positioned in conduit 21 and on bead 48, the assembly will be suspended in position due to action of mounting ring 39 and arm 40 on the adjacent casing surfaces.

After the sealing assembly 13 is thus positioned, a retaining ring element 50 is mounted above it as indicated. The retaining element 50 is of T-shaped section, with the outer arm 51 of the T being bolted to upper casing member 17, the inner arm 52 of the T being spaced above the rigid ring 34, and the T stem 53 extending loosely between ring 34 and the corresponding cylindrical surface of casing 17 to compress the ridge 44 of the seal. The ring 34 is thus free to move axially of the fluid passage to the limited extent permitted by the resilient web 40 and a resilient back-up ring 55 mounted on the inner surface of retaining arm 52. When the ring 34 thus moves upwardly, the arm 40 is bent toward the surface of bead 48, this movement being permitted due to bevelled edge of retaining ring 53 as indicated at 56.

According to the invention, the clearance 58 between the outer ends of rings 34 and back-up rings 55 is considerably less than the clearances between gate member 11 and casing members 17 and 18 when the gate is closed as shown in Figure 2. Accordingly, any upward pressure on gate 11 will act through sealing rib 38 to shift ring 34 upwardly into firm engagement with back-up ring 55 and there will be no engagement of the gate with any portion of the casing, for example the upper wall of slot 27.

In the operation of the gate valve structure, let it be assumed that the gate is in the outer or retracted position shown in Figure 1, and that no fluid is present in conduit 21. At this time, the outer portion of gate 11 rests on snap ring 32, and the inner or forward portion rests on the lower wall of slot 27. The device 33 is then operated to rotate crank 28, the pin 30 then shifting in the transverse slot in gate 11 and serving to move the gate in a forward direction toward conduit 21. As this occurs, the forward gate portion 24 will ride over the rib 38 of upstream sealing assembly 14 and will slide between the ribs 38 of both sealing assemblies until the valve is fully closed as shown in Figure 2. The clearance between the ribs 38 of the upstream and downstream sealing assemblies is approximately the same as the thickness of gate 11, so that no substantial shifting of the sealing assemblies occurs due to mere closing of the gate in the absence of any pressure fluid. When the gate 11 is closed and there is no fluid pressure in the system, the parts assume the position shown in Figure 2. The gate 11 is then centered by the sealing ribs 38, so that it is not in engagement with the walls of slot 27 or groove 26, or with snap ring 32 or the base of bushing 31.

Let it next be assumed that fluid is applied to the underside of gate 11, the valve being in the completely closed position shown in Figure 2. This fluid pressure will tend to shift gate 11 upwardly and press it against the rib 38 of downstream sealing assembly 13, while at the same time either shifting the gate out of engagement with upstream sealing assembly 14 or lessening the degree of pressing between these elements, depending upon the amount of pressure in the system. The sealing effectiveness of downstream sealing assembly 13 is thus increased, and that of upstream assembly 14 decreased or eliminated. Fluid may therefore flow between the gate and rib 38 of upstream assembly 14, and into both the gate chamber 19 and the slot 26 for the gate end portion 24. The fluid in gate chamber 19 has no effect and may not leak out, due to the presence of the gasket 23 and the seal associated with crank journal 29. The fluid in gate end slot 26 will also have no effect, since it is blocked by the gasket 23 from escaping from the valve, and by rib 38 of downstream assembly 13 from passing along the upper gate surface and into the conduit.

It is a feature of the invention that the fluid in slot 26 is also prevented from leaking along seal surfaces 42, 45, and 43, and between ring 34 and the casing 10, to the downstream side of the gate. Although the surfaces 42 and 45 are disengaged from the corresponding surfaces of casing bead 48 when downstream sealing assembly 13 is elevated due to upward pressure on gate 11, the presence of fluid pressure at surface 43 effects pressing of the lower portion of ring 39 radially outwardly to create an effective seal preventing any passage of fluid around the ring 34. Additional seals preventing this action are present between the lower end of T stem 53 and resilient ridge 44, and in some instances between back-up ring 55 and the upper surface of ring 34.

It will be noted that the resilience of sealing web 40 creates a pressure between rib 38 and gate 11 which is constant at all elevated positions of the gate, and until ring 34 engages back-up 55. It follows that at relatively low fluid pressures the resilience of web 40 may be the sole cause of pressing between rib 38 and the gate, since back-up 55 may not be engaged. This sealing pressure created by web 40 will be relatively constant and uniform and will be sufficient to prevent any leakage past rib 38. At higher pressures, effecting shifting of sealing assembly 13 upwardly until back-up 55 is engaged, the pressure between gate 11 and sealing rib 38 will be substantially higher since back-up 55 provides a much greater opposing force than web 40. The higher sealing pressure along rib 38 is thus created when fluid pressures in the system are large, as is necessary to the creation of an adequate seal.

When the gate 11 is again shifted to the open position shown in Figure 1, the resilient web 40 of assembly 13 will shift ring 34 back to its original position despite the friction created by any rapidly flowing fluid in conduit 21. The assembly 14 will also be in the Figure 1 position, regardless of the effects of fluid friction, since casing bead 48 acts through the cooperating seal surface 45 to provide a stop action.

Because of the seal construction embodying the resilient web 40, any slight wearing of rib 38 will have no effect on the sealing pressure between rib 38 and the gate, so that the effectiveness of the seal will not be altered.

Although, for purposes of simplicity, the operation of the valve has been described for the situation where fluid is not present in conduit 21 until after the valve is closed, it will be apparent that in normal operation the fluid is flowing at the time of valve closing.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A gate valve assembly comprising a valve body provided with a gate valve supported for movement transversely of a flow passage through said body, a rigid ring within and coaxial with said flow passage closely adjacent one face of said valve when the latter is positioned across said passage, resilient means for providing a fluid seal between said valve and the adjacent face of said ring in the closed position of the valve, and resilient ring diaphragm means secured between said valve body and said rigid ring effective to bias said valve and said first-mentioned resilient means into sealing engagement as said gate moves into closed position across said flow passage and providing a fluid-tight flexible mounting between said valve body and said rigid ring, said resilient ring diaphragm being formed of elastomeric material and being characterized in that the portion thereof between said ring and said valve body is of frustoconical shape with the small diameter end thereof closer to the surface of said gate valve than the large diameter end thereof, whereby axial pressure acting through the small diameter end toward the large diameter end tends to place the body of said diaphragm in axial compression.

2. A gate valve assembly as defined in claim 1 characterized in that said valve body is provided with duplicate rigid ring and resilient ring diaphragm supporting assemblies, said assemblies being disposed in alignment on the opposite sides of the path of travel of said gate valve and being biased toward one another to engage and seal against said gate valve from its opposite sides, said resilient ring diaphragms being radially narrow with their small diameter inner peripheries closer together than their large diameter outer peripheries whereby the movement of one toward the other with the gate valve closed therebetween is effective to place the frusto-conical portion of the other in compression to resist such movement.

3. A gate valve assembly having a body provided with a flow passage, a gate valve housing projecting normally from said body at one side of said passage, a gate valve therein, means for moving said valve between an open position within said housing to a closed position across said flow passage, and a floating sealing assembly having outer rim sealed to the interior of said valve body at one side of said gate valve path of travel and an inner rim movable axially of said flow passage, said floating assembly including an elastomeric diaphragm so shaped and arranged as to normally resiliently bias said inner rim against one face of said gate valve in the closed position thereof irrespective of the presence or absence of fluid in said valve body.

4. A gate valve assembly as defined in claim 3 including a resilient back-up ring disposed opposite one end of said floating sealing assembly for limiting the axial movement of the latter due to fluid pressure acting on the face of said gate valve remote from said back-up ring.

5. A gate valve assembly as defined in claim 4 including a flanged ring seated across one end of said valve body and having means supporting said back-up ring and for clamping said floating sealing assembly in position in said valve body.

6. An article of manufacture comprising a floating sealing ring assembly suitable for use in a gate valve to provide an axially movable self-aligning seal between a gate valve and a valve body, said sealing ring assembly including a rigid ring, a resilient annular seal projecting axially beyond one end of said ring for sealing engagement with the face of a gate valve, a frustoconically-shaped annular web of flexible resilient material projecting outwardly from and secured to said ring with the small diameter portion thereof closer to said sealing ring than the large diameter portion of said web, whereby said web is adapted to be placed in axial compression as said first-mentioned annular seal is axially compressed.

7. An article of manufacture as defined in claim 6 wherein said resilient annular seal and said annular web are integral, and secured to said rigid ring in a fluid-tight manner.

8. In combination, a gate valve assembly having a main body formed in two mating halves having a fluid flow passage therethrough and a transverse narrow passage therebetween for a gate valve, said mating halves each having an annular flange projecting into the flow passage adjacent said gate valve passage, a pair of floating seal assemblies disposed on either side of said valve passage, said assemblies including a rigid ring resiliently urged toward said gate valve passage by a dished annular ring of impervious resilient material having one rim secured to said ring and its outer rim edge secured to said annular flange on said mating body halves.

9. The combination defined in claim 8 including flanged ring means across the opposite ends of said flow passage and including means for holding the outer rim of said dished annular ring clamped to said flanges of said valve body halves, said flanged ring supporting means extending into the path of said floating seal assemblies at the outer ends thereof for limiting the axial movement thereof in one direction.

10. A gate valve assembly comprising a main body having a circular fluid flow passage therethrough traversed by a laterally movable gate valve, flexible sealing ring means having one rim edge secured to said valve body and another rim positioned to seat against a face of said gate valve to form a seal therewith as the valve moves to a closed position across said passage, said sealing ring having one side thereof exposed to the upstream fluid pressure and utilizing said pressure to hold the rim of said seal pressed against said gate valve, rigid back-up ring means secured to the inner rear face of said sealing ring provided with a cylindrical outer surface having a close sliding fit with said valve casing, the sealing rim edge of said sealing ring being radially narrow and in substantially axial alignment with the outer peripheral wall of said back-up ring whereby there is a relatively small excess of surface area exposed to the fluid pressure on the rear end of said back-up ring than on the end thereof adjacent said sealing edge of said sealing ring.

11. A gate valve assembly as defined in claim 10 wherein said sealing ring includes an annular axially extending flange acting to back up and reinforce the valve-contacting sealing rim thereof.

12. In a gate valve assembly of the type having a valve body provided with a flow passage extending axially thereof and a narrow gate valve passage extending transversely of the flow passage, a gate valve located in said transverse passage movably connected with operating means therefor, that improvement which comprises a flexible fluid-pressure-responsive seal encircling said flow passage interiorly of the valve body closely adjacent one face of said gate valve in the closed position of the latter, one rim of said seal being clamped to the valve body and the other rim being normally biased into initial sealing engagement with said valve as the latter moves to closed position and being adapted to be urged into fluid-tight sealing position against the face of said valve by the pressure of the fluid controlled by said valve, rigid back-up ring means secured to said seal in such manner that its upper axial ends have approximately the same surface areas exposed to fluid pressure within the valve with the preponderant area being at the end remote from the seal whereby the fluid pressure is effective to bias the seal closed but without danger of damage to the parts.

13. In a gate valve assembly as defined in claim 12 wherein the improvement comprises a pair of similar fluid-pressure-responsive seals and rigid backup rings, one seal and rigid backup ring being disposed on one side of said valve and the other seal and rigid backup ring being disposed on the opposite side whereby one of said rings is effective to seal against said gate vlave irrespective of a change in pressure differential on the opposite sides of the valve and irrespective of the direction of fluid flow in said passage.

14. In a gate valve assembly as defined in claim 12 wherein the improvement comprises a pair of similar fluid-pressure-responsive seals disposed on the opposite sides of path of travel of said gate valve and having their adjacent valve-contacting edges spaced apart a distance less than the thickness of said gate valve and adapted to move axially apart to receive said gate valve as it is moved toward closed position between said seals.

15. In a gate valve assembly as defined in claim 14 wherein one side of each of said fluid-pressure-responsive seals is adapted to be exposed to the fluid pressure of the fluid flowing through the valve passage, the opposite side of each of said seals being isolated from the fluid pressure when said seals are sealed against said valve in the closed position thereof.

16. In a gate valve as defined in claim 14 wherein said fluid-pressure-responsive seals each have a frustoconical body portion in coaxial alignment with the small diameter ends thereof facing toward one another.

17. In a gate valve assembly as defined in claim 14 wherein said fluid-pressure-responsive seals each have a frustoconical body portion in coaxial alignment with their small diameter ends facing toward the opposite sides of said gate valve and the interior surfaces of said frustoconical body portions exposed to the fluid pressure on the opposite sides of said valve whereby the pressure on the high-pressure side of said valve is effective on the associated one of said seals to hold the seal seated against the high-pressure side of said valve, and whereby the axial movement of the valve under the pressure differential across the valve is resisted by the frustoconical portion of the other of said seals.

References Cited in the file of this patent

UNITED STATES PATENTS

| | | |
|---|---|---|
| 420,155 | Hageman | Jan. 28, 1890 |
| 1,095,212 | Johnson | May 5, 1914 |
| 2,238,357 | Allen | Apr. 15, 1941 |
| 2,370,751 | Prager | Mar. 6, 1945 |
| 2,606,740 | Allen | Aug. 12, 1952 |
| 2,696,967 | Wilson | Dec. 14, 1954 |
| 2,701,117 | Bashark | Feb. 1, 1955 |
| 2,705,019 | Volpin | Mar. 29, 1955 |
| 2,732,170 | Shand | Jan. 24, 1956 |

FOREIGN PATENTS

| | | |
|---|---|---|
| 802,047 | France | of 1936 |
| 503,511 | Belgium | June 15, 1951 |
| 671,546 | Great Britain | May 7, 1952 |
| 1,053,141 | France | Sept. 30, 1953 |